United States Patent
Stone et al.

(10) Patent No.: US 8,284,554 B2
(45) Date of Patent: Oct. 9, 2012

(54) ELECTRONIC DEVICE HOUSING WITH PIVOTING AND SLIDING PORTIONS

(75) Inventors: Frank H. Stone, Waukegan, IL (US); Yoo Jung Ahn, Chicago, IL (US); Roger W. Harmon, Crystal Lake, IL (US); Michael J. Lombardi, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 321 days.

(21) Appl. No.: 12/705,693

(22) Filed: Feb. 15, 2010

(65) Prior Publication Data
US 2011/0199718 A1    Aug. 18, 2011

(51) Int. Cl.
G06F 1/16       (2006.01)
G06F 3/02       (2006.01)
H04M 1/00       (2006.01)

(52) U.S. Cl. ........... 361/679.56; 361/679.55; 455/575.1; 455/575.3; 455/575.4; 345/168; 345/169; 345/905

(58) Field of Classification Search ........... 361/679.01–679.45, 679.55–679.59; 455/575.1, 575.3, 575.4; 345/156, 157, 168, 345/169, 905
See application file for complete search history.

(56) References Cited

U.S. PATENT DOCUMENTS

| | | |
|---|---|---|
| D337,569 S | 7/1993 | Kando |
| D524,809 S | 7/2006 | Alcouloumre et al. |
| D525,609 S | 7/2006 | Kim et al. |
| D531,608 S | 11/2006 | Kim et al. |
| D531,611 S | 11/2006 | Kim et al. |
| D532,791 S | 11/2006 | Kim |
| D534,145 S | 12/2006 | Lheem |
| D546,313 S | 7/2007 | Lheem |
| D548,713 S | 8/2007 | Lee et al. |
| D554,099 S | 10/2007 | Kim et al. |
| D554,149 S | 10/2007 | Kim |
| D556,211 S | 11/2007 | Howard |
| D557,239 S | 12/2007 | Lee |
| D558,720 S | 1/2008 | Lee et al. |
| D558,756 S | 1/2008 | Andre et al. |
| D559,220 S | 1/2008 | Lee et al. |
| D561,148 S | 2/2008 | Chen |
| D562,285 S | 2/2008 | Lim |
| D562,292 S | 2/2008 | Park |
| D562,795 S | 2/2008 | Nara |
| D563,938 S | 3/2008 | Kim et al. |
| D565,978 S | 4/2008 | Stevens et al. |

(Continued)

OTHER PUBLICATIONS

HTC Touch Pro2, announced Feb. 2009, [online], [retrieved on Feb. 20, 2009]. Retrieved from Internet ,<URL:http://www.gsmarena.com>.

(Continued)

*Primary Examiner* — Jayprakash N Gandhi
*Assistant Examiner* — Nidhi Desai
(74) *Attorney, Agent, or Firm* — Stephen H. Shaw

(57) ABSTRACT

An electronic handset device includes a panel pivotally coupled to a base housing portion wherein the panel is pivotal between closed and opened configurations relative to the base housing portion. A movable housing portion is slidably coupled to the panel and is pivotal in unison with the panel. A user interface on the panel is concealed by the movable housing portion when the movable housing portion slides to a closed configuration relative to the panel, and the user interface is exposed when the movable housing portion slides to an opened configuration relative to the panel.

12 Claims, 8 Drawing Sheets

U.S. PATENT DOCUMENTS

| | | |
|---|---|---|
| D569,837 S | 5/2008 | Baik et al. |
| D571,234 S | 6/2008 | Reeson et al. |
| D572,227 S | 7/2008 | Yoon et al. |
| D573,143 S | 7/2008 | Park et al. |
| D575,259 S | 8/2008 | Kim et al. |
| D575,760 S | 8/2008 | Kim et al. |
| D578,098 S | 10/2008 | Oh |
| D578,503 S | 10/2008 | Shin et al. |
| D580,396 S | 11/2008 | Kang et al. |
| D580,401 S | 11/2008 | Kim et al. |
| D596,608 S | 7/2009 | Kim et al. |
| D597,512 S | 8/2009 | Kim et al. |
| D601,535 S | 10/2009 | Huang |
| D605,626 S | 12/2009 | Park |
| D606,537 S | 12/2009 | Ferrari et al. |
| D608,322 S | 1/2010 | Kim |
| D611,030 S | 3/2010 | Hirano |
| D615,946 S | 5/2010 | Mun |
| D617,755 S | 6/2010 | Leinvuo |
| D619,566 S | 7/2010 | Yu |
| D619,989 S | 7/2010 | Huang |
| D619,990 S | 7/2010 | Lai |
| D629,779 S | 12/2010 | Ahn et al. |
| 8,081,449 B2 * | 12/2011 | Lin et al. ............ 361/679.56 |
| 2007/0080950 A1 | 4/2007 | Lee et al. |
| 2007/0105606 A1 * | 5/2007 | Yoon et al. ............ 455/575.4 |
| 2007/0123322 A1 * | 5/2007 | Mizushina ............ 455/575.1 |
| 2007/0135181 A1 | 6/2007 | Ohki et al. |
| 2007/0287512 A1 | 12/2007 | Kilpi et al. |
| 2008/0004085 A1 | 1/2008 | Jung et al. |
| 2008/0051161 A1 | 2/2008 | Tashiro |
| 2008/0081505 A1 | 4/2008 | Ou et al. |
| 2008/0132288 A1 | 6/2008 | Misawa |
| 2009/0181734 A1 * | 7/2009 | Kato et al. ............ 455/575.4 |
| 2009/0247248 A1 * | 10/2009 | Ito ............ 455/575.4 |
| 2009/0286573 A1 * | 11/2009 | Jang et al. ............ 455/566 |
| 2009/0286580 A1 * | 11/2009 | Murakoso et al. ............ 455/575.4 |
| 2010/0113100 A1 | 5/2010 | Harmon et al. |
| 2010/0267428 A1 * | 10/2010 | Wang et al. ............ 455/575.4 |

OTHER PUBLICATIONS

Philips X800, announced May 2008, [online], [retrieved on May 14, 2008]. Retrieved from Internet ,<URL:http://www.gsmarena.com>.

LG GC900 Viewty Smart, announced Apr. 2009, [online], [retrieved on Apr. 16, 2009]. Retrieved from Internet ,<URL:http://www.gsmarena.com>.

Nokia 5530 XpressMusic, announced Jun. 2009, [online], [retrieved on Jun. 23, 2009]. Retrieved from Internet,<URL:http://www.gsmarena.com>.

Apple iPhone, announced Jan. 2007, [online], [retrieved on Mar. 12, 2007]. Retrieved from Internet ,<URL:http://www.gsmarena.com>.

Samsung F490, announced Jan. 2008, [online], [retrieved on Jan. 18, 2008]. Retrieved from Internet,<URL:http://www.gsmarena.com>.

LG KE850 Prada, announced Jan. 2007, [online], [retrieved on Feb. 20, 2007 and May 18, 2007]. Retrieved from Internet, <URL:http://www.gsmarena.com>.

LG KF700, announced Feb. 2008, [online], [retrieved on Mar. 21, 2008 and May 14, 2008]. Retrieved from Internet,<URL:http://www.gsmarena.com>.

Motorola ROKR E6, announced Dec. 2006, [online], [retrieved on Feb. 16, 2007]. Retrieved from Internet ,<URL: http://www.gsmarena.com>.

Motorola ROKR E8, announced Sep. 2007, [online], [retrieved on Dec. 13, 2007]. Retrieved from Internet ,<URL: http://www.gsmarena.com>.

Samsung F700, announced Feb. 2007, [online], [retrieved on Feb. 8, 2007]. Retrieved from Internet ,<URL:http://www.gsmarena.com>.

Page et al., "Communication Device" U.S. Appl. No. 29/304,459, filed Mar. 3, 2008; Abandoned May 20, 2009.

Page et al., "Communication Device" U.S. Appl. No. 29/304,460, filed Mar. 3, 2008; Abandoned Jan. 26, 2009.

Page et al., "Communication Device" U.S. Appl. No. 29/304,461, filed Mar. 3, 2008; Abandoned May 20, 2009.

* cited by examiner

ELECTRONIC DEVICE HOUSING WITH PIVOTING AND SLIDING PORTIONS

CROSS-REFERENCE TO RELATED APPLICATIONS

The present application is related to commonly owned, co-pending U.S. application Ser. No. 29/355,826 entitled "Communication Device", the contents of which are fully incorporated herein and for which benefits are claimed under 35 U.S.C. 120.

FIELD OF THE DISCLOSURE

The present disclosure relates generally to portable electronic devices and, more particularly, to portable electronic devices, for example, wireless communication handsets, having housings with portions that pivot and slide relative to a base housing portion.

BACKGROUND

There is currently market demand for portable electronic devices, for example, wireless communication and gaming devices, with large displays and full keypads, like Qwerty keypads, with relatively large keys. Known solutions for this market segment include housings having a display accommodating portion that slides laterally relative to a base portion to reveal a keypad. Other devices include hinged housing portions that pivot open to reveal a keypad. Other devices slide and pivot. For example, U.S. Publication No. 2008/0081505 entitled "Electronic devices With Sliding And Tilting Mechanisms, and Associated Methods" discloses an electronic device having a first housing component that slides relative to a second housing component by the engagement and interaction of guide members and slide members, wherein a keypad is exposed when the first component is offset relative to the second component. In U.S. Publication No. 2008/0081505, provided the guide and slide members are disengaged, the first component may be pivoted upwardly at an angle relative to the second component to adjust a viewing angle of a display embedded on the first component.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
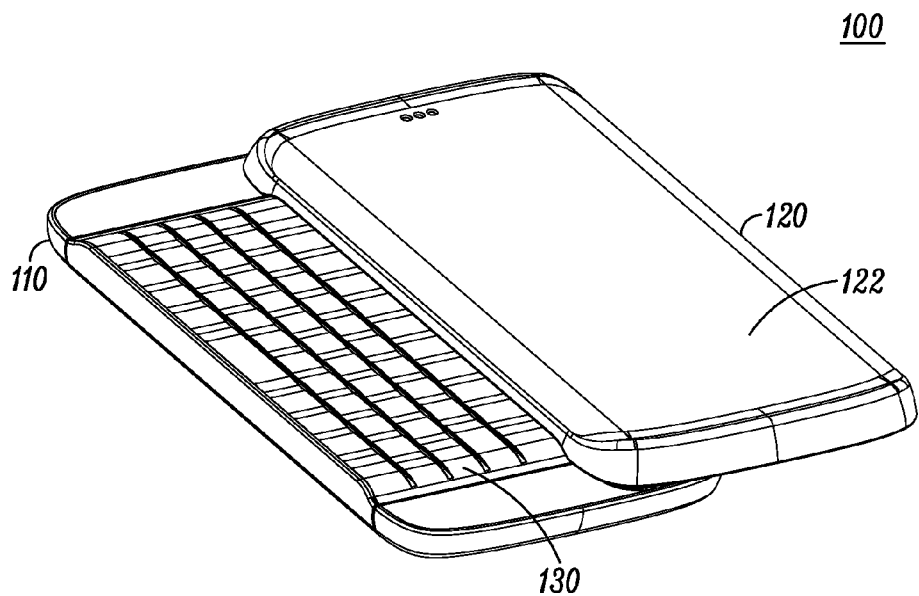
FIG. 1 is a perspective view of an electronic device in a first opened configuration.

In FIG. 1, an electronic handset device 100 comprises a base housing portion 110 and a movable housing portion 120. In one particular implementation, the electronic handset device is embodied as a wireless communication device comprising one or more wireless transceivers. For example, the transceiver may be a cellular transceiver, a WAN or LAN transceiver, a personal space transceiver like Bluetooth, a satellite signal transceiver, or some other wireless transceiver, or a combination of two or more of such transceivers. In another implementation, the portable electronic device is embodied as a personal electronic organizer with or without wireless communication capability. In other implementations, the device includes a receiver or a transmitter, either alone or in combination with a wireless transceiver. For example, the device may include a satellite positioning system (SPS) receiver, a television or radio signal receiver, or some other receiver. The device may thus be embodied as a satellite navigation device, or as a handheld scanning device, or a portable multimedia recording and/or playback device, or some other device with or without wireless communications capabilities. The particular implementation of the electronic device is not intended to limit the disclosure.

Some electronic devices include a controller that controls functionality of the device. In one embodiment, the controller is embodied as a programmable processor that executes firmware or software stored in one or more memory devices wherein the firmware or software enables some functionality of the portable electronic device. Such a controller is typically coupled to a memory device, which may be embodied as one or more discrete devices including, but not limited to, volatile or nonvolatile memory such as random access memory (RAM) and read-only memory (ROM) among other memory devices. Alternatively, the functionality of the portable electronic device may be implemented by equivalent hardware circuits or by a combination of software and hardware. The enabling of the basic functionality of portable electronic devices including wireless communication devices, personal electronic organizers and other portable electronic devices is known generally by those having ordinary skill in the art and is not discussed further herein. The drawings do not illustrate a controller but controllers and associated elements like memory are well known generally to those of ordinary skill in the art.

In some portable electronic devices including a programmable processor, the device includes an operating system that accommodates one or more software-based applications. In wireless communication device applications, the operating system could be embodied as ANDROID, WINDOWS MOBILE, SYMBIAN or some other proprietary or non-proprietary operating system. Other operating systems may also be used. More generally, however, the portable electronic device does not include any operating system. In some embodiments, the functionality is controlled by embedded software or firmware and in other embodiments the functionality is implemented by hardware equivalent circuits or a combination of hardware and software. The particular architecture of the operating system and/or processor executable programs that control the functionality of the device, if any, is not intended to limit the disclosure.

Figure 2:
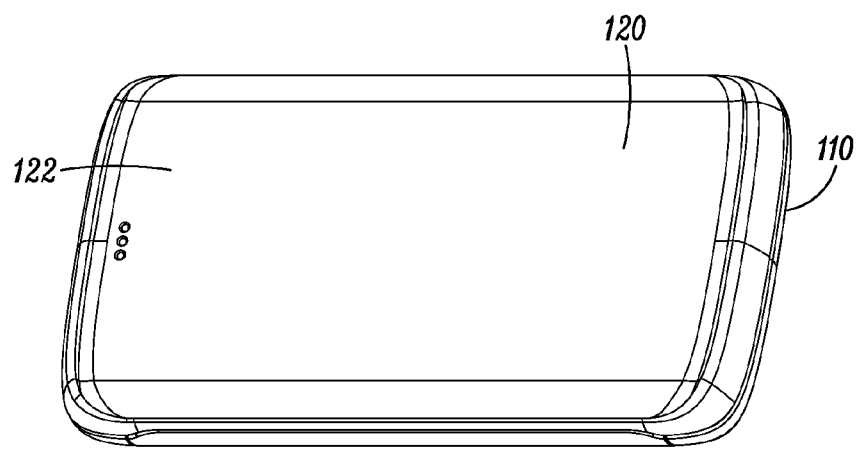
FIG. 2 is a perspective view of the electronic device in a closed configuration.

In FIG. 1, the movable housing portion 120 is laterally offset relative to the base housing portion 110 in an opened configuration to reveal or expose a user interface 130. FIG. 2 illustrates the electronic device handset in a closed configuration wherein the movable housing portion 120 is slidably positioned atop the base housing portion 120 to conceal the user interface. The movable housing portion is laterally positioned relative to the base housing portion by sliding relative thereto as described further below. As the movable housing portion moves laterally relative to the base housing portion between the closed and opened configurations, planar dimensions of the base and movable housing portions remain substantially parallel. These and other aspects of the sliding operation are descried further below.

Figure 3:
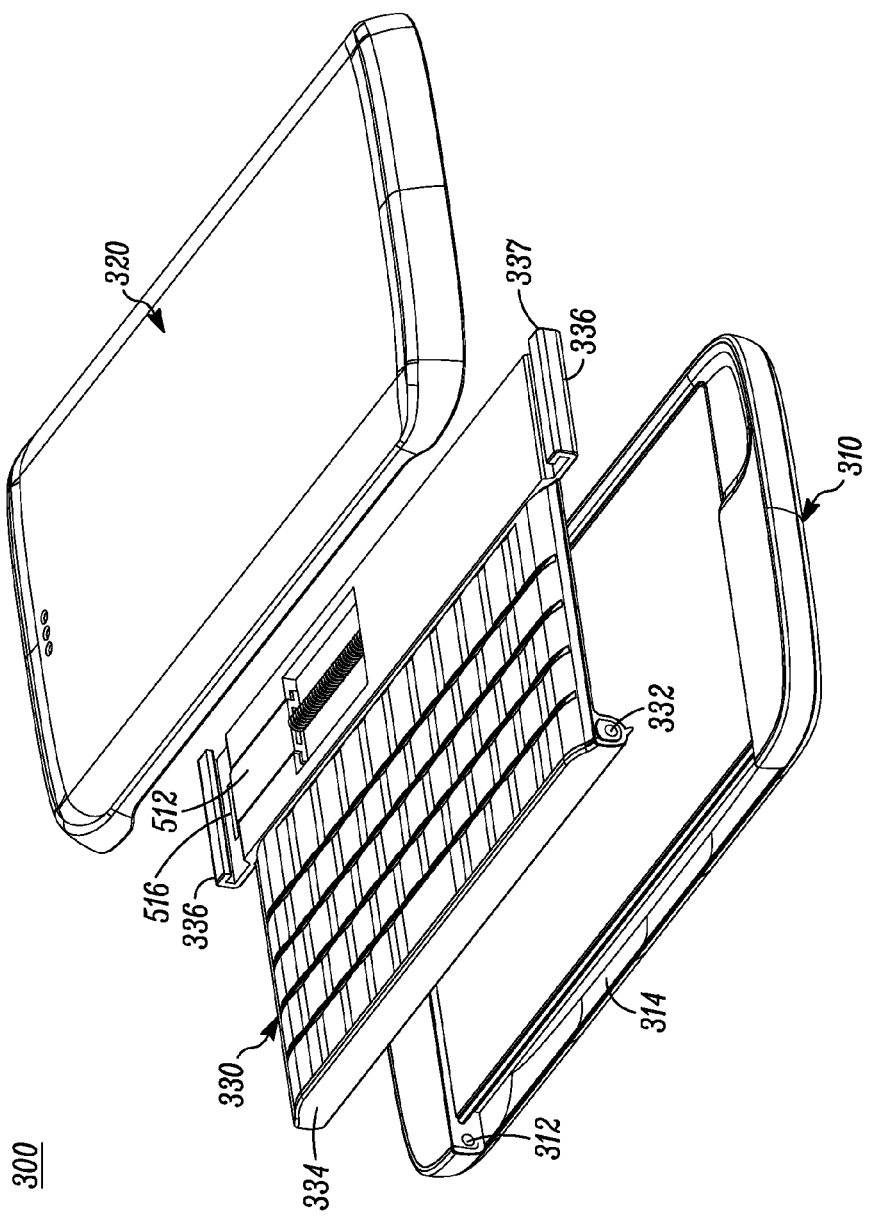
FIG. 3 is an exploded view of an electronic device.

In FIG. 3, the electronic handset device 300 comprises a base housing portion 310, a movable housing portion 320 and a panel 330 pivotally coupled to the base housing portion 310 by a hinge. The panel is pivotal about the hinge axis between the closed configuration illustrated in FIG. 2 and an opened configuration illustrated in FIGS. 4 and 5. In the opened configuration, planar dimensions of the panel and base intersect, depending on the extent to which the panel is pivoted relative to the housing. In some embodiments, when the panel is pivoted 180 degrees, the planar dimensions of the panel and base housing portions may be parallel or lie in a common plane, depending on the hinge configuration.

Figure 4:
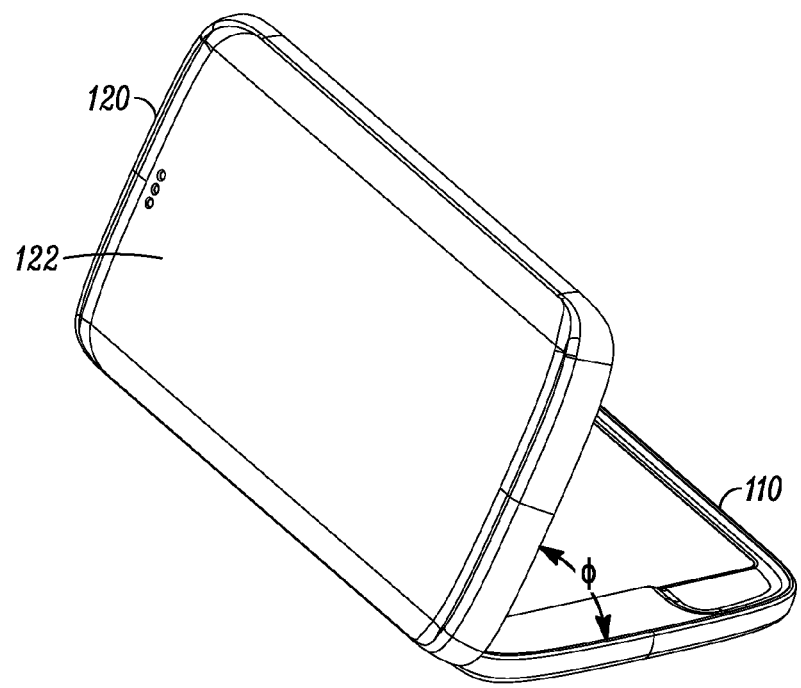
FIG. 4 is a perspective view of the electronic device in a second opened configuration.

In FIG. 4, the panel is tilted approximately 70 degrees relative to the base housing portion as measured by the angle φ. In FIG. 3, the location and configuration of the hinge permits pivotal movement of the panel over a range of more than 180 degrees relative to the base housing portion. Particularly, the hinge axis is located symmetrically between the inner and outer sides of the base housing portion, and the panel flange 334 and base recess 314 are configured to accommodate the tilting of the panel throughout this angular range. More generally, the hinge may be configured to permit as much as 360 degrees of rotation. Various hinge configurations that may be employed to pivotally couple the panel to the housing, and also to facilitate as much as 360 degrees of rotation between the panel and base housing portion are well known in the art. Thus the present disclosure is not limited to a particular hinge assembly or range of pivotal or rotational motion.

In some embodiments, the hinge includes a frictional element like a rubber washer disposed about one or both shaft portions between the panel and the base housing portion. The frictional element tends to bind the panel as the panel pivots relative to the base housing portion to permit adjustably positioning the panel at fixed angular orientations or configurations relative to the base housing portion. In some embodiments, an indexing member may be used to fix the panel at one of several distinct angular orientations relative to the base housing portion. In other embodiments, a rotational bias is imposed on the panel to cause the panel to rotate toward the opened or closed configuration or in both directions. Biased hinge mechanisms are generally well known in the art and thus not described further herein. A biased hinge could also be used to bias the panel to one of several distinct angular orientations specified by an indexing member.

In FIG. 3, the hinge generally comprises shaft portions 332 (only one of which is visible in FIG. 3) extending from opposite ends of the panel. The shaft portions may be discrete elements or part of a unitary shaft. In FIG. 3, the shaft portions extend from a knuckle 334 that protrudes along an edge of the panel 320. The shaft portions 332 extend into corresponding holes 312 in walls of a recess 314 formed in the base housing portion 310. The recess 314 accommodates the panel knuckle and permits pivoting action of the panel relative to the base housing portion. In one embodiment, the hinge shaft portions are axially retractable into the panel against the bias of a spring or other mechanism that biases the shafts axially outwardly. Retracting the shaft portions permits positioning the panel knuckle into the recess to align the shaft portions with the corresponding holes, whereupon the biased shaft portions extend into the corresponding holes. In other embodiments, a unitary shaft is extended through the base housing portion and through the panel to pivotally capture the panel, without the use of a biasing member. Various other mechanisms may also be used to pivotally couple the panel to the base housing portion and thus the instant disclosure is not intended to be limited to a particular pivoting mechanism.

Figure 6:
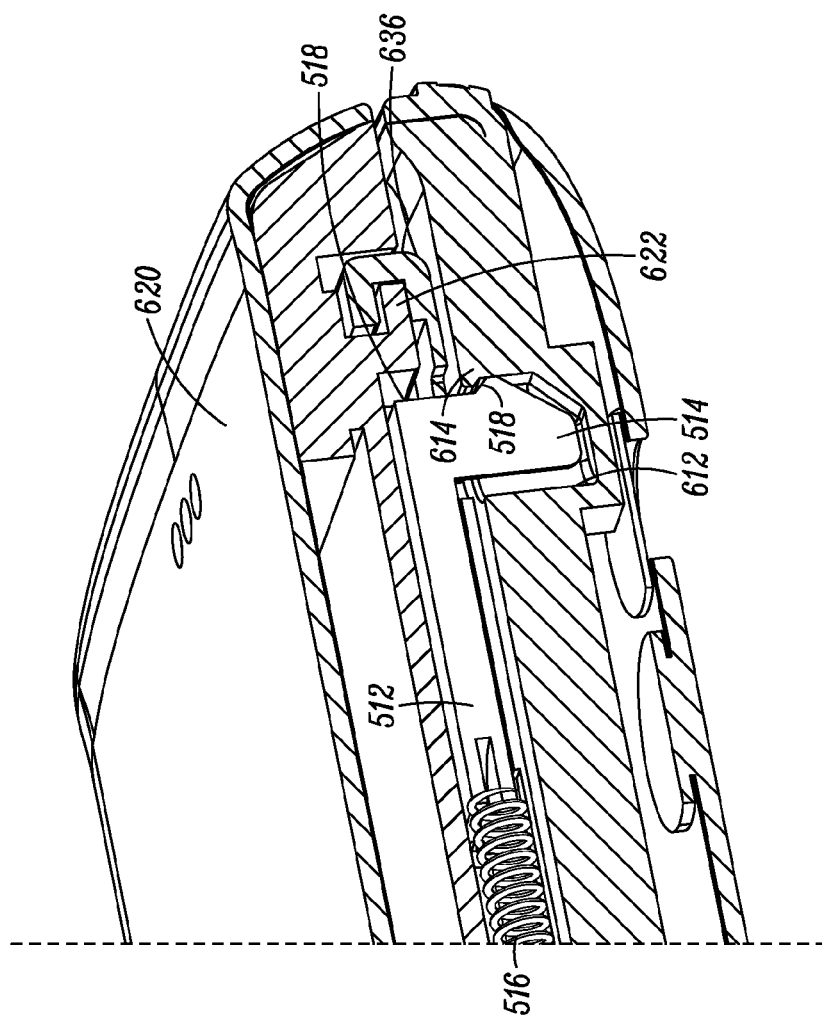
FIG. 6 is a partial sectional view of an electronic device.

In FIG. 3, the electronic handset device includes a movable housing portion 320 slidably coupled to the panel 330. The panel 330 comprises laterally disposed rail portions 336 located on opposite portions of the panel. In FIG. 6, the movable housing portion 620 comprises laterally disposed flanges 622 (only one of which is illustrated). The panel rails 636 capture the housing flanges 622 to slidably retain the movable housing portion 620 to the panel. The hinge or pivot axis is fixed relative to the base housing portion. Thus the movable housing portion is slidably positioned relative to the hinge. In FIG. 1, in the opened position, the movable housing portion 120 is moved away from the hinge to reveal the user interface, and in FIG. 2, in the closed position, the movable housing portion 120 is moved toward the hinge to conceal the user interface. In FIG. 4, the movable housing portion pivots in unison with the panel as the panel is pivoted relative to the base housing portion.

The range of sliding motion may be limited by protrusions or stops on the flange that engage ends 337 of the rail. Alternatively, the sliding action of the movable housing portion may be limited by caps covering the ends of the rails. The positioning of the movable housing portion along the rails of the panel may also be arrested by interacting indexing members on the flanges and rails. For example, the indexing members may fix the movable housing in the opened and closed positions by providing increased friction in the these positions, wherein the movable housing portion may be re-positioned by application of a force that overcomes the friction generated by the interaction of the indexing members. The indexing members may be embodied as a spring biased bearing or other protrusion that extends into a complementary recess. Alternatively, the movable housing portion may be slidably coupled to panel by other means known in the art. Various other indexing members may be used to fix the movable housing member at various positions relative to the panel.

In some embodiments, it may be desirable to prevent the panel from pivoting when the movable housing portion is in the opened configuration illustrated in FIG. 1. According to this aspect of the disclosure, a pivot-preventing member disposed on the panel engages the base housing portion when the panel is in the closed configuration. Alternatively, a pivot-preventing member disposed on the base housing portion may engage the panel. The engaged pivot-preventing member prevents pivoting of the panel relative to the base housing portion. In this pivot-preventing latched configuration, the movable housing portion is free to slide relative to the panel (and the base housing portion) between the opened and closed configurations illustrated in FIGS. 1 and 2, respectively, when the panel is latched to the base housing portion.

Figure 5:
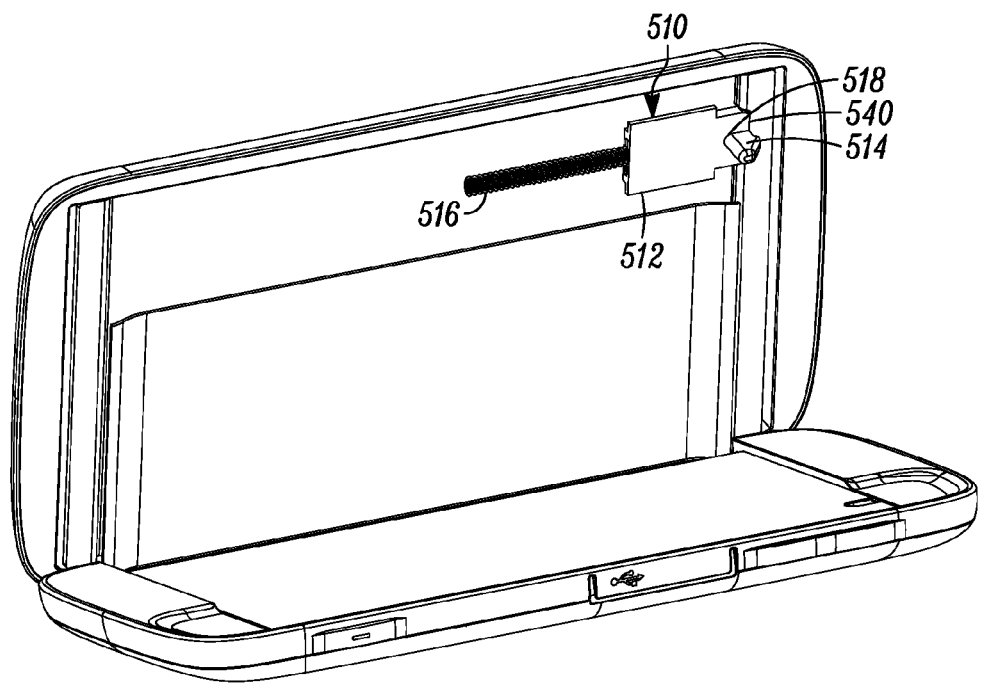
FIG. 5 is another perspective view of the electronic device in the second opened configuration.

FIG. 5 illustrates an exemplary pivot-preventing latch mechanism 510 comprising a slidable carriage 512 with a latch 514 protruding from an inner side of the panel. In FIG.

Figure 7:
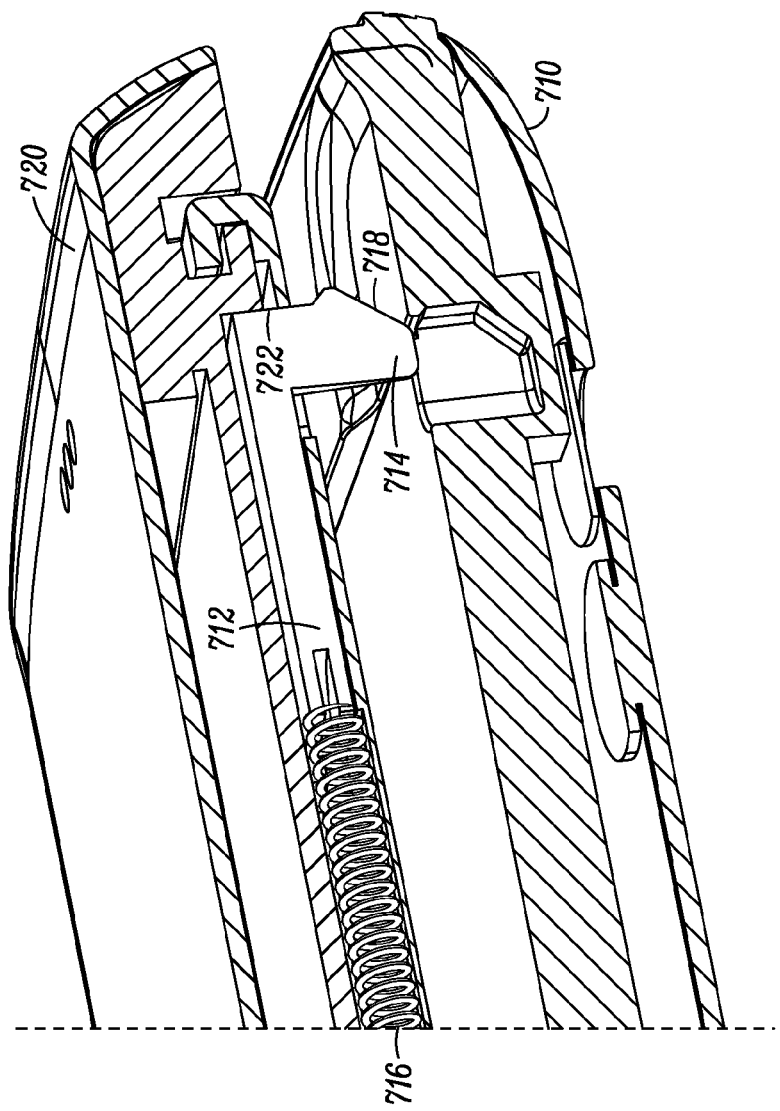
FIG. 7 is another partial sectional view of an electronic device.

3, the carriage is slidably retained in a slot formed in the panel. A spring 516 biases the carriage and the latch toward a lateral portion of the panel. FIG. 6 illustrates the latch 514 disposed in and engaged with a recess 612 formed in the base housing portion. Particularly, the latch includes a beveled edge 518 engaged with a lip 614 of the recess in the base housing portion. In one embodiment, interaction between the beveled edge 518 and the lip 614 permit retraction of the carriage against the bias of the spring and release of the latch upon applying sufficient pivotal force to the panel and the movable housing portion. In other embodiments, however, the latch may be released by manually retracting the carriage by some user accessible element that acts on the carriage or latch. The latter manual release configuration would permit use of a latch that locks more securely, as would be the case if the surface 518 was formed at a right angle to the vertical edge of the latch and engaged with a complementary surface within the recess. FIG. 7 illustrates the panel and movable housing portion 720 pivoted partially away from the base housing portion 710 such that the latch is released from the recess. In this released configuration, the spring biases the carriage laterally until it abuts a surface 722 of the movable housing portion. In this configuration, the latch 714 is partially misaligned relative to the accommodating recess 612 in the base housing portion. Upon pivoting the panel toward the closed configuration, another beveled edge 718 of the latch 714 engages an aperture of the recess. The interaction of the beveled edge of the latch and the recess aperture causes retraction of the carriage against the bias of the spring 716 until the latch is disposed into and engaged with the recess. In other embodiments, various other latching mechanisms may be employed alternatively. The present disclosure is not intended to be limited to a particular pivot-preventing latch assembly, if any. The pivot-preventing latch may be employed alone or in combination with the slide-preventing latch.

In some embodiments, it may be desirable to prevent the movable housing portion from sliding when the panel is in the opened configuration illustrated in FIGS. 4 and 5. According to this aspect of the disclosure, a slide-preventing member disposed on the panel engages the movable housing portion when the panel is in the opened configuration relative to the base housing portion. Alternatively, a slide-preventing member disposed on the movable housing portion may engage the panel. The engaged slide-preventing member prevents the movable housing portion from sliding relative to the panel. In this slide-preventing latched configuration, the panel and movable housing portion are free to pivot relative to the base housing portion between the closed and opened configurations illustrated in FIGS. 2 and 4, respectively, when the movable housing portion is latched to the panel.

FIG. 5 illustrates an exemplary slide-preventing latch mechanism 510 comprising a slidable carriage 512 having an end 518 that engages a slot formed in the movable housing portion to prevent sliding thereof, as described further below. In this embodiment, the slide-preventing mechanism is integrated with the pivot-preventing mechanism. Alternatively, however, the slide-preventing latch and the pivot-preventing latch may be implemented separately. As described above in connection with the pivot-preventing mechanism, the carriage 512 is slidably retained in the panel 330 as illustrated in FIGS. 3, 6 and 7. FIG. 5 illustrates the spring and carriage, apart from the panel, including the end 518 of the carriage engaged with the slot 540 in the movable housing portion. In FIG. 6, when the pivot-preventing member 514 is engaged with the base housing portion, the carriage 512 is positioned against the bias of the spring 516 so that the end 518 of the carriage does not engage the movable housing portion and particularly the slot thereof. In this configuration, the movable housing portion is free to slide between the closed and opened configurations. In FIG. 7, when the panel and the movable housing portion are pivoted from the closed configuration to the opened configuration, the pivot-preventing member 714 is no longer constrained by the recess in the base housing portion and the carriage moves under the bias of the spring. If the movable housing portion is positioned to conceal the user interface and the panel is pivoted open, the spring will bias the slide-preventing member into engagement with the slot of the movable housing portion, as illustrated in FIG. 5. In other embodiments, various other latching mechanisms may be employed alternatively. The present disclosure is not intended to be limited to a particular pivot-preventing latch assembly, if any. The slide-preventing latch may be employed alone or in combination with the pivot-preventing latch. In other embodiments, however, neither a slide-preventing latch nor a pivot-preventing latch is employed.

In the particular implementation of FIG. 1, the user interface 130 is a tactile input device, and the movable housing portion 120 includes a display 122 on its outer side. The tactile input device could be embodied as a mechanical input device or a virtual input device implemented on a touch screen of a display device. For example, the tactile input device could be embodied as a keypad, like a Qwerty keypad or some other arrangement of alphanumeric input keys, a touch sensitive pad that controls a cursor, or a handwriting or other symbol input surface, among other input devices. Alternatively, the user interface 130 could be implemented as a display and a tactile input device could be located on the movable housing portion. The particular type and location of the one or more user interfaces implemented, if any, on the electronic device is not intended to limit the disclosure. Thus, in FIG. 1, when the movable housing portion is positioned open to expose the keypad, the user may interact with the keypad while viewing the display. In the closed configuration illustrated in FIG. 2, the user may interact with user interface 122, which may include a display and/or a tactile interface.

In the tilted configuration, as the movable housing portion tilts or pivots relative to the base housing portion, planar dimensions of the base and movable housing portions intersect at an angle, as illustrated in FIGS. 4 and 5. The tilted open configuration of FIG. 4 may be utilized one or more different ways. In one embodiment, the display 122 disposed on the outer side of the moveable housing portion may be inclined upright relative to the supporting base housing portion 110. Information, content or an application may thus be viewed on the display. For example, the upright oriented display may present an image, a series of still images, or streaming video content, or provide other information, the particular form of which is not intended to limit the disclosure. In another embodiment, some other user interface is disposed on the outer side of the movable housing portion. In another embodiment, the tilted open configuration in FIG. 5 may expose one or more user interfaces on one or both of the inner sides of the base and movable housing portions. Note that in FIG. 5, the spring and carriage assembly may be concealed by the panel. These user interfaces may be implemented alone or in combination with user interfaces on the outer sides of the movable and base housing portions. In other embodiments, the inner sides of the base and movable housing portions are devoid of user interfaces. Here too the particular type and location of the one or more user interfaces implemented on the electronic device is not intended to limit the disclosure.

Figure 8:
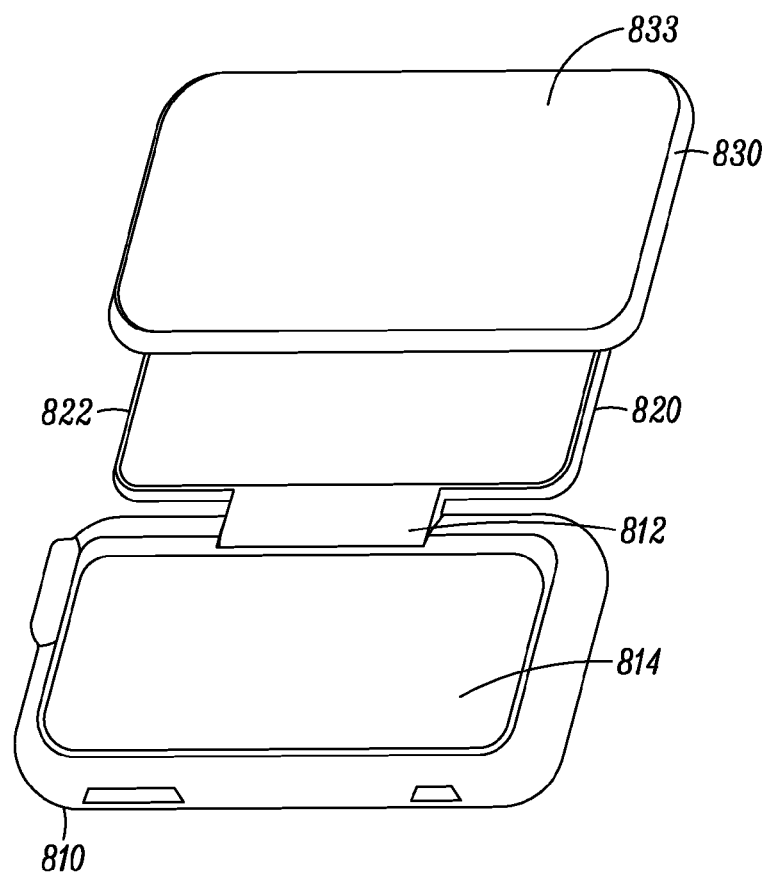
FIG. 8 a perspective view of the electronic device in a third opened configuration.

In FIG. 8, an electronic device 800 comprises a base housing portion 810 and a panel 820 pivotally coupled thereto by a hinge 812. The base housing portion includes a first user interface 814, for example, a tactile keypad alone or in combination with a display. The panel 820 includes a movable housing portion 830 slidably coupled thereto and configurable between the opened configuration shown in FIG. 8 and a closed configuration wherein the movable housing portion conceals the panel. The movable housing portion may be slidably coupled to panel as described above in connection with the embodiment of FIG. 1 or by other means known in the art. In one embodiment, the movable housing portion includes a user interface 833 on an outer side thereof, and the panel also includes a user interface 822. In one particular implementation, the user interface 833 on the movable housing portion is a display and the user interface 822 on the panel is a tactile interface. In FIG. 8, unlike the embodiment of FIG. 1, the movable housing portion 830 is not slidably locked relative to the panel 820 when the panel is pivoted to the opened position. In FIG. 8, after pivoting the panel 820 to the opened position, the movable housing portion is slidable to expose or conceal a user interface 822 on the panel.

Figure 9:
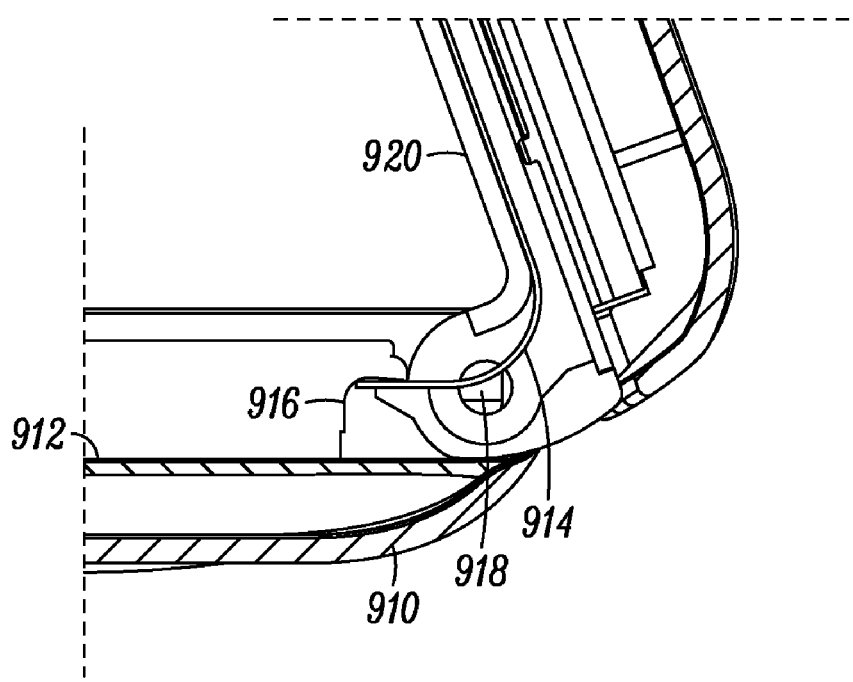
FIG. 9 is a partial sectional view of an electronic handset device in a pivotally opened configuration.

In electronic device handsets, generally, a user interface on the panel or the movable housing portion requires an electrical connection to provide power, control, addressing and data signaling. In FIG. 9, a base housing portion 910 includes an electrical circuit, which may include a circuit board 912 having an electrical conductor or contacts. A first electrical conductor interconnects the electrical circuit disposed in the base housing portion and a user interface disposed on the pivotal panel 920. For example, the user interface could be the tactile interface 130 illustrated in FIG. 1. The electrical conductor includes a flexible conductor portion 914 extending from the base housing portion to the user interface. The flexible conductor generally includes a conducting element 916 encased in a flexible and insulated sheath, which may be ribbon-like. Flexible conducting ribbons are well known generally by those having ordinary skill in the art and are not described further herein. In FIG. 9, the flexible conductor extends through or adjacent to the hinge axis 918 and into the panel where it is electrically coupled to the user interface. The flexible conductor accommodates pivotal motion of the panel and movable housing portion relative to the base housing portion.

Figure 10:
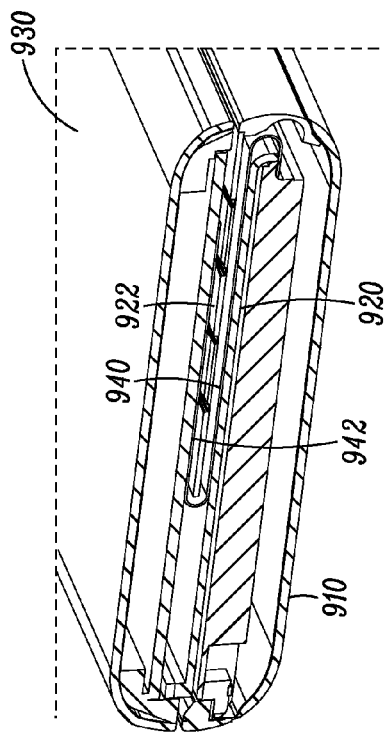
FIG. 10 is a partial sectional view of an electronic handset device in a closed configuration.
Figure 11:
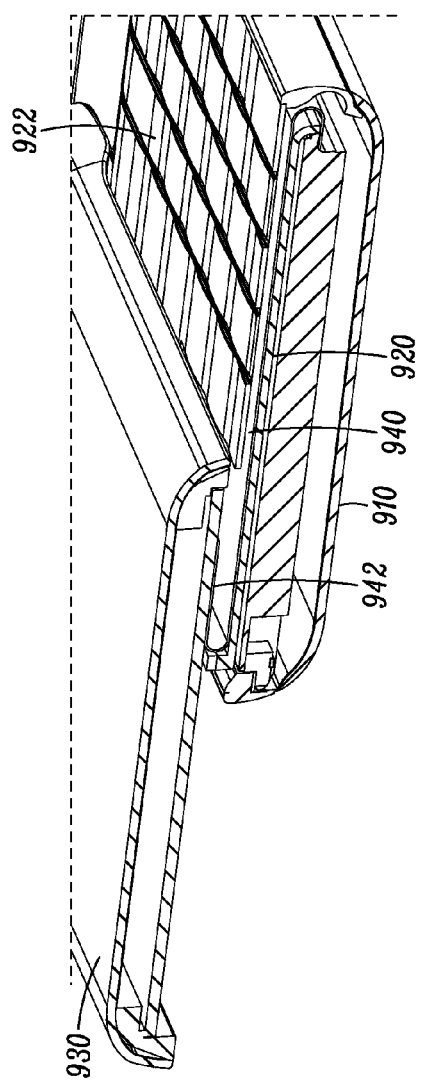
FIG. 11 is a partial sectional view of an electronic handset device in an opened configuration.

In FIGS. 10 and 11, an electrical conductor interconnects the user interface of the movable housing portion 930 with an electrical circuit of the base housing portion 910. The first electrical conductor includes a U-shaped flexible conductor portion having a first leg 940 at least partially disposed between the first user interface 922 and the panel 920. A second leg 942 of the U-shaped flexible conductor portion is disposed along a side of the movable housing portion. As the movable housing portion 930 slides relative to the panel 920, the position of the U-shaped portion of the flexible conductor moves such that the relative lengths of the legs change to accommodate the movement of the movable housing portion.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:
1. An electronic handset device comprising:
a base housing portion;
a panel including a first user interface, the panel pivotally coupled to the base housing portion by a hinge, the panel pivotal between a closed configuration and an opened configuration relative to the base housing portion;
a movable housing portion slidably coupled to the panel, the panel and the movable housing portion pivot in unison relative to the base housing portion, the movable housing portion having a second user interface,
the movable housing portion slidable relative to the hinge between an opened configuration and a closed configuration relative to the panel,
a slide-preventing member disposed on the panel, the slide-preventing member engaged with the movable housing portion when the panel is in the opened configuration relative to the base housing portion, the engaged slide-preventing member prevents sliding of the movable housing portion relative to the panel,
wherein the panel is pivotable relative to the base housing portion when the slide-preventing member is engaged with the movable housing portion;
wherein the first user interface is concealed by the movable housing portion when the movable housing portion is in the closed configuration and the first user interface is exposed when the movable housing portion is in the opened configuration.

2. The device of claim 1 further comprising
a pivot-preventing member disposed on the panel, the pivot-preventing member engaged with the base housing portion when the panel is in the closed configuration, the engaged pivot-preventing member prevents pivoting of the panel relative to the base housing portion,
wherein the movable housing portion is slidable relative to the panel when the pivot-preventing member is engaged with the base housing portion.

3. The device of claim 1,
the base housing portion having an inner side and an outer side;
the first user interface disposed on a first side of the panel opposite a second side of the panel that faces the inner side of the base housing portion when the panel is in the closed configuration,
the second user interface disposed on a first side of the movable housing portion, a second side of the movable housing portion, opposite the first side of the movable housing portion, faces the first user interface.

4. The device of claim 3 further comprising
a pivot-preventing member disposed on the panel, the pivot-preventing member engaged with the base housing portion when the panel is in the closed configuration, the engaged pivot-preventing member prevents pivoting of the panel and the movable housing portion relative to the base housing portion,
wherein the movable housing portion is slidable relative to the panel and the base housing portion, to expose and conceal a keypad, when the pivot-preventing member is engaged with the base housing portion.

5. The device of claim 4 further comprising the slide-preventing member disposed on the panel, the slide-preventing member engaged with the movable housing portion when the panel is in the opened configuration relative to the base housing portion, the engaged slide-preventing member prevents sliding of the movable housing portion relative to the panel and the base housing portion, wherein the panel and movable housing portion are pivotable relative to the base housing portion when the slide-preventing member is engaged with the movable housing portion.

6. The device of claim 5 further comprising
a biasing member biasing the slide-preventing member into engagement with the movable housing portion, the pivot-preventing member and the slide-preventing member are interconnected, the slide-preventing member biased away from the movable housing portion when the pivot-preventing member is engaged with the base housing portion.

7. The device of claim 3, the first user interface is a keypad and the second user interface is a display disposed.

8. The device of claim 1 further comprising a first electrical conductor interconnecting an electrical circuit disposed in the base housing portion and the second user interface, the first electrical conductor including a U-shaped flexible conductor portion, a first leg of the U-shaped flexible conductor portion at least partially disposed between the first user interface and the panel, a second leg of the U-shaped flexible conductor portion disposed along a side of the movable housing portion.

9. The device of claim 8 further comprising a second electrical conductor interconnecting the electrical circuit disposed in the base housing portion and the first user interface, the second electrical conductor including a flexible conductor portion extending from the base housing portion, near an axis of the hinge, and to the panel.

10. The device of claim 1, the hinge has an axis disposed through an end of the base housing portion, wherein the panel and the movable housing portion are pivotal more than 180 degrees relative to the base housing portion.

11. The device of claim 1, the hinge located toward one end of the base housing portion, the movable housing portion movable toward an opposite end of the base housing portion when the movable housing portion slides toward the opened configuration.

12. The device of claim 1, the hinge located toward one end of the base housing portion, the movable housing portion movable away from an opposite end of the base housing portion when the movable housing portion slides toward the opened configuration.

* * * * *